Oct. 30, 1928.

W. H. PIERCE 1,690,078

NUT AND SCREW FASTENING

Filed July 22, 1925

Inventor:
Walter H. Pierce.
by Emery Booth Janney + Varney
Attys

Patented Oct. 30, 1928.

1,690,078

UNITED STATES PATENT OFFICE.

WALTER H. PIERCE, OF CAMBRIDGE, MASSACHUSETTS, ASSIGNOR TO CARR FASTENER COMPANY, OF CAMBRIDGE, MASSACHUSETTS, A CORPORATION OF MAINE.

NUT AND SCREW FASTENING.

REISSUED

Application filed July 22, 1925. Serial No. 45,281.

This invention aims to provide an improved nut and screw fastening installation.

In the drawings which illustrate a preferred embodiment of my invention,

Figure 1:
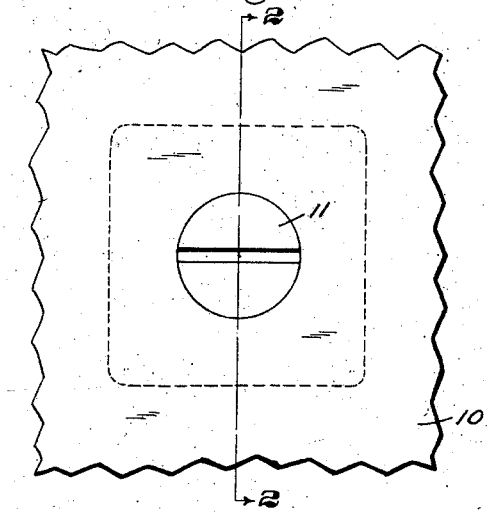
Fig. 1 is a front elevation of the complete installation.

Referring to the drawings, I have shown a plurality of parts secured together by the use of a nut unit initially secured to one part by the resiliency of one part of the unit and a screw passing through the other part and secured to the nut unit as more fully hereinafter described.

The nut unit illustrated in the drawings is particularly useful in connection with securing metal parts together especially when the inner face of the nut unit supporting part is inaccessible so that the usual nut could not readily be used. The unit is very strong and durable and is therefore adapted for use for securing hinges of doors, locks, etc., to supporting parts such as automobile bodies.

In the drawings the fastening elements are shown in connection with securing two sheet metal parts together. The inner part 1 is initially prepared for reception of the unit by forming a depression 2 therein having an aperture 3 through the bottom of the depression.

Figure 2:
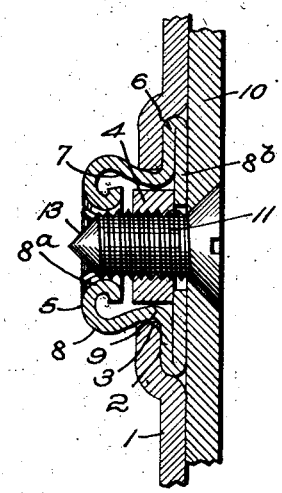
Fig. 2 is a section on the line 2—2 of Fig. 1, being partly in elevation.
Figure 3:
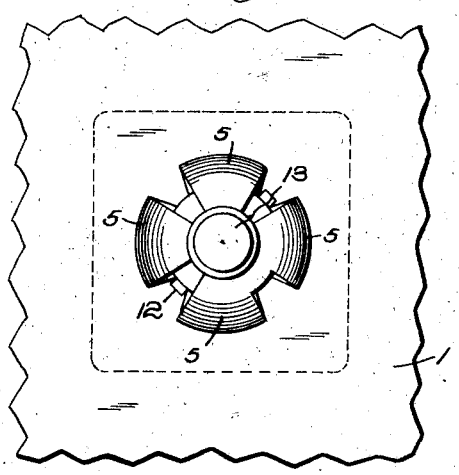
Fig. 3 is an elevation view showing the nut unit secured to its support.
Figure 4:
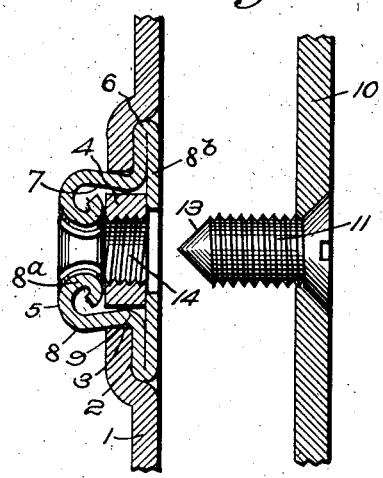
Fig. 4 is a section of the parts shown in Fig. 2 before the screw is engaged with the nut.
Figure 5:
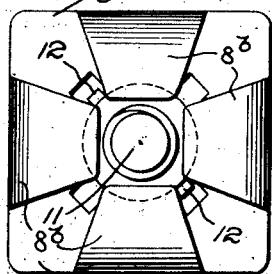
Fig. 5 is a side elevation of the nut unit.
Figure 6:
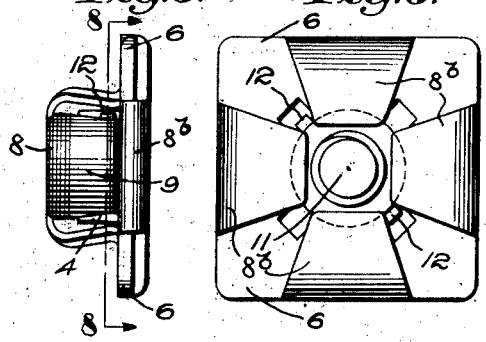
Fig. 6 is a front elevation of the nut unit.
Figure 7:
Fig. 7 is a side elevation of the nut.

The nut unit includes a nut 4 and a nut holder 5 preferably assembled at the point of manufacture. The holder 5 is pressed from a single piece of metal and is provided with a relatively large base portion 6 adapted to fit into the depression 2 in the part 1. A plurality of fingers 7 are pressed from the base and extend outwardly therefrom to form a resilient head 8 and neck 9, the head being somewhat larger in cross-sectional area than the aperture 3. The outer or free ends of the fingers are curved inwardly from the head 8 thereby to form cam surfaces 8ᵃ for contact with the screw as hereinafter described. In assembling the nut unit the nut is placed between the fingers 7 and is held in assembly with the nut holder 5 by a plurality of ears 8ᵇ formed at the periphery of the base and bent back over the base to overlie the nut as shown in Figs. 2, 4 and 6.

Figure 8:
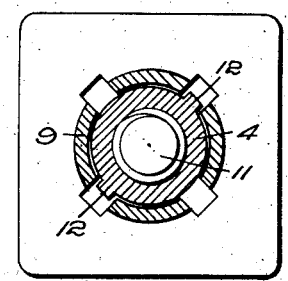
Fig. 8 is a section on the line 8—8 of Fig. 5.

Sufficient space is provided between the nut and fingers (Fig. 8) to permit contraction thereof during entrance into or withdrawn from the aperture 3 in the support 1.

From the above description it will be understood that it is only necessary to snap the head 8 of the unit through the aperture 3 to secure the unit to the support 1 (Fig. 4) so that it cannot fall out of the aperture if the support is thereafter turned upon its side. This is a particularly necessary factor of the invention when the nut unit is secured to the support 1 at a time previous to the time when it is necessary to secure the part 10 to the part 1. The nut will always be ready for use at any time thereafter without requiring the use of a tool to hold it while the screw 11 is being engaged therewith.

The base portion 6 of the holder and the depression 2 are provided with rectangular peripheries which cooperate to prevent turning of the holder relative to the support 1 when the base 6 is located in the depression. Also the nut 4 presents lugs 12 which project into the slits between the fingers 7 of the nut holder (Fig. 8) to prevent rotation of the nut relative to the holder. Thus I have provided cooperating means for holding the parts of the nut unit against turning movement while the screw 11 is threaded into the nut 4.

During the operation of securing the parts 1 and 10 together the end of the screw 11 passes through the nut and the tapered end 13 thereof engages the cam surfaces 8ᵃ, which intersect the threaded hole 14 in the nut 4. As the screwing together operation continues the screw enters between the cam surfaces 8ᵃ (Fig. 2) and bends or expands the fingers 7 outwardly, as shown in Fig. 2. The screw thereafter back supports the fingers so that they cannot contract and separate from the support 1 while the parts 1 and 10 are secured together.

While I have shown and described a preferred embodiment of my invention it will be understood that changes involving omission, substitution, alteration and reversal of parts and even changes in the mode of operation may be made without departing from the scope of the invention which is best defined in the following claims.

Claims:

1. A nut and screw fastened installation comprising, in combination, a plurality of parts to be secured together, a nut unit passing into an aperture presented by one of said parts, said nut unit including an initially assembled nut and nut-holder, the nut having a screw-receiving aperture and the nut-holder having a number of resilient fingers bent inwardly to intersect the screw-receiving aperture in the nut and a screw for passage through the aperture in the nut to engage said inbent resilient fingers, thereby to expand and back-support said nut-holding part to prevent contraction thereof and secure said parts together.

2. A nut and screw fastened installation comprising, in combination, a plurality of parts to be secured together, a nut unit snapped into an aperture presented by one of said parts, said nut unit including a nut and a resilient nut holding part, and a screw passing through said nut to engage and expand the resilient portions of said nut holding part thereby to prevent separation of said nut unit from its supporting part while said parts are secured together.

3. A nut and screw fastened installation comprising, in combination, a plurality of parts to be secured together, a nut holder presenting a plurality of resilient fingers snapped through an aperture in one of said parts to hold a nut in assembled relation with said part and a screw engaging and back supporting said fingers to prevent contraction thereof when said parts are secured together.

4. A nut and screw fastened installation comprising, in combination, a plurality of parts to be secured together, a nut holder presenting a plurality of resilient fingers snapped through an aperture in one of said parts to hold a nut in assembled relation with said part and a screw for engagement with the nut to secure said parts together, said fingers presenting inwardly curved portions at their free ends overhanging a screw receiving hole in said nut so as to be expanded by said screw thereby to expand said fingers to prevent separation of the nut holding part from its supporting part while said parts are secured together by said screw.

5. A nut and screw fastened installation comprising, in combination, a plurality of parts to be secured together, a nut holder presenting resilient means for holding said nut holder in assembled relation with one of said parts, means for preventing rotation of the nut holder relative to said part, a screw receiving nut held by said nut holder, means for preventing relative rotation between the nut and nut holder and a screw for threaded engagement with said nut to secure said parts together, said screw passing through said nut and engaging and expanding said resilient means thereby to prevent separation of the nut holder from its supporting part while said parts are secured together.

In testimony whereof, I have signed my name to this specification.

WALTER H. PIERCE.